United States Patent
Zhong et al.

(10) Patent No.: US 7,583,039 B2
(45) Date of Patent: Sep. 1, 2009

(54) BRUSHLESS DC MOTOR CONTROL METHOD AND BRUSHLESS DC MOTOR CONTROLLER

(75) Inventors: Minxian Zhong, Shanghai (CN); Bin He, Shanghai (CN); Xiaodong Yao, Shanghai (CN); Junzhong Zou, Shanghai (CN)

(73) Assignees: Shanghai Sanden Behr Automotive A/C Co., Ltd., Shanghai (CN); East China University of Science and Technology, Shanghai (CN)

( * ) Notice: Subject to any disclaimer, the term of this patent is extended or adjusted under 35 U.S.C. 154(b) by 0 days.

(21) Appl. No.: 10/585,169

(22) PCT Filed: Dec. 29, 2004

(86) PCT No.: PCT/CN2004/001552

§ 371 (c)(1),
(2), (4) Date: Jun. 16, 2008

(87) PCT Pub. No.: WO2005/074119

PCT Pub. Date: Aug. 11, 2005

(65) Prior Publication Data

US 2008/0231217 A1   Sep. 25, 2008

(30) Foreign Application Priority Data

Dec. 30, 2003   (CN) .................. 2003 1 0124504

(51) Int. Cl.
H02P 6/18   (2006.01)
(52) U.S. Cl. .................. 318/400.07; 318/400.3; 318/400.35
(58) Field of Classification Search .................. 318/254, 318/139, 266, 439, 430–434, 400.1, 400.14, 318/400.07, 400.03, 400.35
See application file for complete search history.

(56) References Cited

U.S. PATENT DOCUMENTS 5,115,174 A   5/1992   Masuda et al.

(Continued)

FOREIGN PATENT DOCUMENTS

CN   1100576   3/1995
CN   1180956   5/1998

OTHER PUBLICATIONS

International Search Report dated Apr. 7, 2005.

*Primary Examiner*—Paul Ip
(74) *Attorney, Agent, or Firm*—Hamre, Schumann, Mueller & Larson, P.C.

(57) ABSTRACT

The present invention discloses a control technology for brushless DC motor, in which firstly it is to build or import a motor running parameters' database, then detect the signals always running and the signals closely relevant to the rotor's rotating state such as the voltage and the current, and process these signals and figure out the signals about the rotor's position. Wherein these detected signals should be filtered before being used, and the best filter is the low-pass filter to cut out the high frequency components, and the cut-off frequency of the low-pass filter are determined by the motor running voltage U and PWM signal width when the motor is running at no load, finally determine if the motor is working properly by means of the motor running parameters stored in the database in advance, that is to determine if the detected value is identical with the one predicted from the database. Depending on the results from the detecting and comparison above, the control signal is generated to adjust the motor running state. With the technical method in this invention, the position sensor is not needed. This reduces the motor's external wiring amounts and the wiring complexity. Also the motor's seal is improved. Meanwhile, it is possible to measure the rotor's position accurately in any state according to this invention technology. Thus the motor running state can be controlled properly.

35 Claims, 9 Drawing Sheets

U.S. PATENT DOCUMENTS

2007/0182355 A1* 8/2007 Ueda et al. .................. 318/599
2007/0289808 A1* 12/2007 Yasui et al. ................. 180/446
2008/0048598 A1* 2/2008 Shibuya ................... 318/400.1
2008/0252242 A1* 10/2008 Akama et al. .......... 318/400.14
2008/0281491 A1* 11/2008 Yasui et al. ................... 701/44

* cited by examiner

BRUSHLESS DC MOTOR CONTROL METHOD AND BRUSHLESS DC MOTOR CONTROLLER

CROSS REFERENCE OF RELATED APPLICATIONS

The present application requests the priority of the Chinese application numbered 200310124504.6 and entitled "Air-condition Electric Compressor Controller", being filed on Dec. 30, 2003. The application has been assigned to the assignee of this patent application and the whole documents are incorporated herein by reference.

1. Field of Invention

The invention relates to air-condition motor control technology. More particularly, refers to the controller for brushless DC motor without position sensor and the controlling method thereof.

2. Background of Invention

To start running a brushless DC motor comprises three sequences: the rotor locating, the forced synchronous accelerating run and the synchronous (switched) run. In this procedure, the testing of the motor rotor's position is important for the running control of motor. The commonly used technique is installing a position sensor based on Hall devices in the rotor to detect the rotor position in the permanent magnet excited Brushless DC motor, then the phase of the stator winding power supply is determined. Therefore the magnetic field generated by the stator rotates the rotor and the motor starts rotating. At present, the position sensor is used to detect the position of the rotor. Due to its many and complexity of wiring, it is easy to make the wrong wiring. The wrong wiring will induce that the motor can not be started and the excessive current will burn down the motor. Meanwhile, the additional wiring is prohibitive to the seal for the compressor. After long-term use of the motor, the position sensor will deviate and the efficiency of the motor will decrease dramatically. In the worst case, the motor will loose its synchronousness or burn down. In the position control of brushless DC motor, the rotor position is determined by the position-detecting unit to monitor the Electromotive Force (EMF) of the motor. When the motor is still or the motor rotating speed is very low, the EMF becomes tiny. In this case, the position-detecting unit cannot detect the position of the rotor.

According to the analysis above, the use of the position sensing unit in the motor is not a good technique. Moreover, the current techniques of the motor control based on the position sensing unit has appeared an obvious drawback, which is the weak control of the motor when the motor is at the state of stillness or very low speed. Hence a new type of motor control method and controller is needed, which does not use the position sensing device to detect the position of the rotor, but control the motor running by the data detected.

SUMMARY OF THE INVENTION

The first object of the invention is to provide a motor controller to detect the rotor position without using the position sensor.

The second object of the invention is to provide a method of detecting the rotor position without using the position sensor.

According to one aspect of this invention, providing a brushless DC motor controller without position sensor, comprising:

position-detecting unit, connecting to a motor, detecting the zero crossing point of the electrode by means of the motor's back Electromotive Force (EMF) and calculating the authentic positional signals;

current-detecting unit, connecting to the motor, detecting the current and generating the current signal;

power supply detecting unit, connecting to the operating power source, detecting the operating voltage and supply the voltage transform;

central control unit, connecting to the position-detecting unit, current-detecting unit, and power supply detecting unit, generating the controlling signals by means of the positional signal, the current signal and the transformed voltage; wherein the central control unit comprises, storage device, storing the database of the motor running parameters;

Initialization device, initializing all devices in the controller;

signal processing device, generating the central control output signal by means of the received signals from the central control unit and the database of the motor running parameters;

power drive control unit, connecting to the central control unit, receiving the control signals and generate the high voltage electrical signals by means of the control signals;

motor drive control unit, connecting to the power drive control unit and the motor, also connecting to the operating power supply, receiving the high voltage electrical signal and control the motor running by means of these signals.

According to other aspects of the invention, a brushless DC motor controller is provided and applied in the sensorless brushless DC motor. The controller comprises:

position-detecting circuit, connecting to the motor, detecting the zero crossing point of electrode by means of the motor's voltage signals and calculate the authentic positional signals;

current-detecting circuits, connecting to the motor, detecting the current and generate the current signal;

voltage-detecting circuits, connecting to the operating power source, detecting the operating voltage and supply the voltage transform;

control circuits, connecting to the position-detecting unit, current-detecting unit, and power supply detecting unit, generating the controlling signals by means of the positional signal, the current signal and the transformed voltage; wherein the control circuits is configured to, storing the database of the motor running parameters;

initializing all devices in the controller;

signal processing, generating the output control signal by means of the received signals from the control circuits and the database of the motor running parameters.

power drive control circuits, connecting to the control circuits, receiving the control signals and generate the high voltage electrical signals by means of the control signals;

motor drive control circuits, connecting to the power drive control circuits and the motor, also connecting to the operating power supply, receiving the high voltage electrical signal and control the motor running by means of these signals.

According to another aspect of this invention, a control method is provided for the sensorless brushless DC motor, comprising:

building the database of the motor running parameters and store them;

Initializing all devices in the controller;

detecting the back electromotive force by means of the motor's voltage signals, and detecting the zero crossing point of electrode to calculate the authentic positional signals;

generating the current signal by detecting the motor's current;

generating the control signal by means of the positional signal, current signal and the motor running parameter database;

generating the high voltage electrical signal by means of the control signals;

controlling the motor in terms of the high voltage signal.

According to another aspect of this invention, a control method is provided for the sensorless brushless DC motor, comprising:

building the database of the motor running parameters and store them;

Initializing all devices in the controller;

detecting the back electromotive force by means of the motor's voltage signals, and detecting the zero crossing point of electrode to calculate the authentic positional signals;

generating the current signal by detecting the motor's current;

generating the control signal by means of the positional signal, current signal and the motor running parameter database;

generating the high voltage electrical signal by means of the control signals;

controlling the motor in terms of the high voltage electrical signal.

According to the present invention, the motor running parameter database includes the motor parameters as below: the motor operating voltage; the load; PWM signal width; the conduction angle; the motor rotating speed; the current vector and phase shift. Moreover, the database is built as the steps: set the motor operating voltage, PWM signal width and conduction angle; adjust the load by testing the motor rotating speed at each load, the current and real Hall position; further compare the real Hall position and the detected Hall position to calculate the phase shift.

By using the technique of the present invention, the position sensor is not needed and the wiring quantity and wiring complexity are decreased. The motor seal improves. Meanwhile according to the technique of this invention, the motor rotor position can be detected accurately in various states, and the motor running state can be controlled well.

DETAILED DESCRIPTION OF PREFERRED EMBODIMENT

Figure 1:
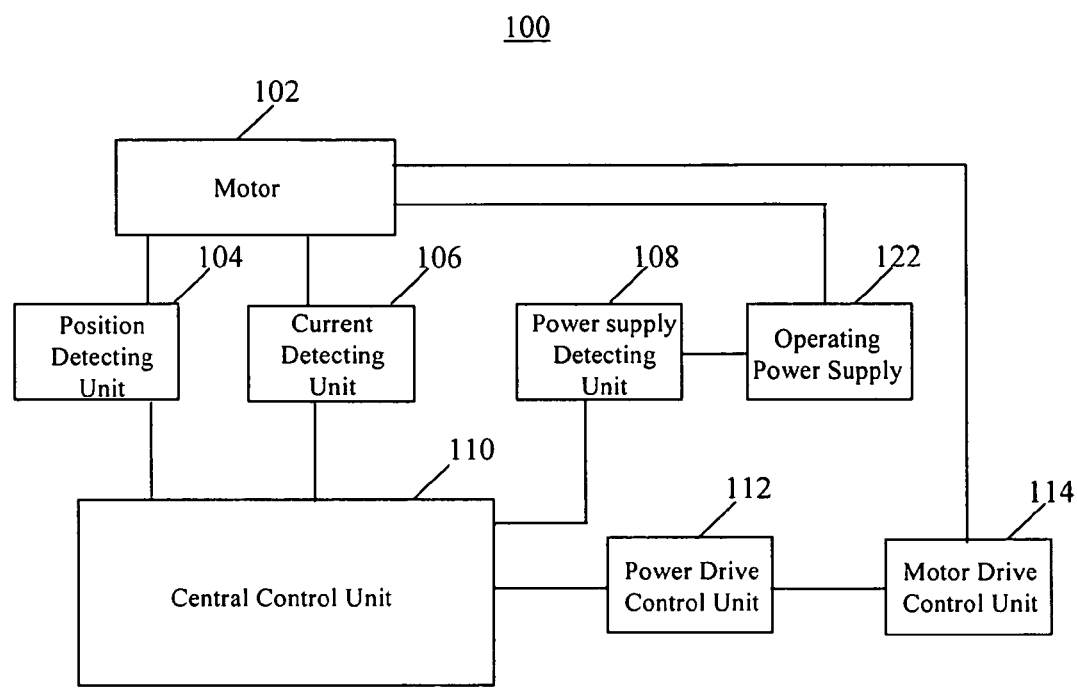
FIG. 1 shows a function diagram of the invented brushless DC motor controller in the actual scale.

Referring now to the drawings attached which further illustrate the technical implementation of the invention.

Firstly the invention principle is explained. This invention builds the database of the motor running parameters, and then detects the signals pertinent to the rotor's running state such as the voltage and the current, finally after processing these signals obtains the signals about the rotor's position. For instance, the rotor's position is determined by detecting the motor's induced EMF. But in a real circumstance, especially in a circumstance with a high voltage and a large load, due to the disturbance signal the induced EMF detected appear the edge signals. If these edge signals are not eliminated, the rotor's position will be determined incorrectly. Thus the motor can not operate properly. Hence these detected signals should be filtered before being used. The best filter is the low-pass filter to cut out the high frequency components. The cut-off frequency of the low-pass filter are determined by the motor running voltage U and PWM signal width when the motor is running at no load. Determine if the motor is working properly by means of the motor running parameters stored in the database in advance, that is to determine if the detected value is identical with the one predicted from the database. Depending on the results from the detecting and comparing above, the control signal is generated to adjust the motor running state.

Figure 8:
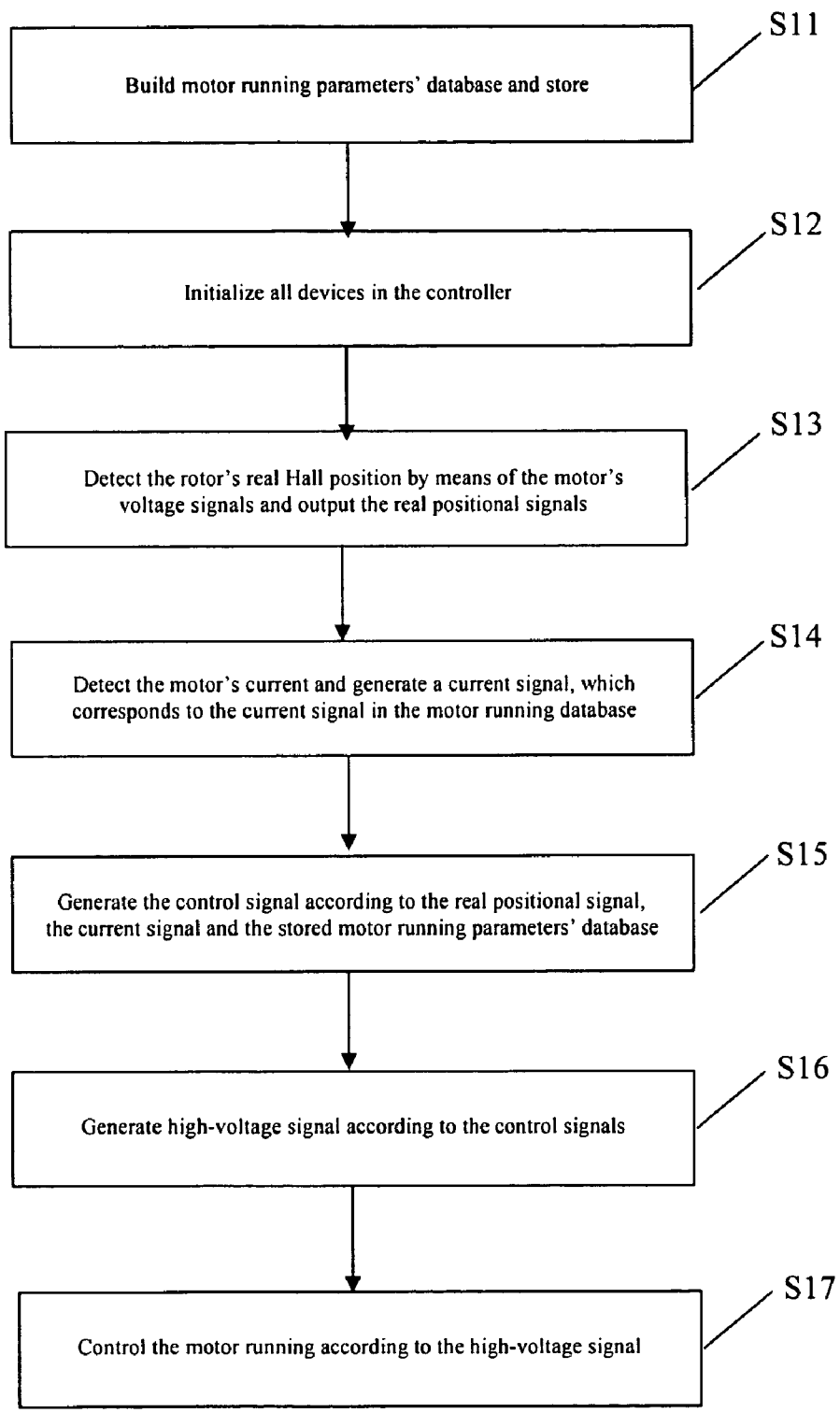
FIG. 8 shows the flow chart of the control method in the invention.

For the motor controller method in this invention, the important thing is to have only one motor running parameters' database. The motor running parameters' database should be built before proceeding to the control stage as shown in FIG. 8:

S11. Build the motor running parameters' database. The parameters relevant to the motor running are mainly the operating voltage U, the load P, PWM signal width W, the conduction angle A, the motor rotating speed V, the current vector I and the phase shift Q (the phase difference between the detected phase and theoretical phase). Theoretically the parameters above have the relation as: there are three operators S1, S2 and S3. The function is obtained by applying three operators as below:

$$V=S1\ (U, P, W, A);$$

$$I=S2\ (U, P, W, A);$$

$$Q=S3\ (U, P, W, A);$$

While the current I can be typified by a matrix, I=[I1, I2, I3, I4]. I1, I2, I3 and I4 indicate the current of the DC bus, U phase, V phase and W phase respectively in the motor. However under the realistic operating condition, the operators S1, S2 and S3 are the complicated nonlinear functions and it provides the huge dynamic range of the function inputs. As a result the function above is not accurate enough. Moreover for the complexity of three operators, it is not feasible to apply the functions to the relations of each motor's parameters in a real operating situation. Therefore this invention employ a method to build the motor rotating database that is built on the basis of massive experimental data. The database includes all the parameters discussed above. For a specific motor running state, there is one set of corresponding parameters (U, P, W, A, V, I, Q). After obtaining some of the parameters, other parameters can be found out in that state by using the database. To build the database the procedures can be carried out as: set the motor operating voltage U, PWM signal width W and the conduction angle A (the conduction angle is usually a constant); adjust the load P and detect the motor rotating speed V, the current I and the measured phase Q' according to each load P; calculate the phase shift Q by comparing the measured phase Q' and the theoretical phase Q''; finally build the motor running parameters' database. Then it is to normalize the parameters into the range of [0,1]. Considering the motor parameters vary rapidly at the stage of the motor starting and the parameters vary slowly after the starting. The interval of the step length L is smaller at the stage of the motor starting, yet the interval of the step length is larger after the starting. This will reduce the database and the interval of the step length is in the range of [0.001, 0.05].

After building the database discussed, it can be used to control the motor running. The control method shown in FIG. 8 also includes the steps as:

S12. Initialize all devices in the controller. The specific initialization details will be further illustrated with the aid of FIG. 1 and FIG. 2.

S13. Detect the rotor's real Hall position by means of the motor's voltage signals and output the real positional signals. In this step, the motor's voltage signals are actually the voltage signals coming from 4-way which are U phase, V phase, W phase and DC bus. The 4-way voltage signals are used to calculate the rotor's current real position. For the four voltage signals, U phase voltage is filtered through the U phase filter circuit, and divided by U phase voltage divider circuit, then amplified by the U phase operational amplifier; V phase voltage is filtered through the V phase filter circuit, and divided by V phase voltage divider circuit, then amplified by the V phase operational amplifier; W phase voltage is filtered through the W phase filter circuit, and divided by W phase voltage divider circuit, then amplified by the W phase operational amplifier; the positive terminals of U phase, V phase and W phase operational amplifiers connect to each phase voltages, and the negative terminals connect to another voltage signal, i.e. DC bus voltage signal. Eventually in this step a rotor's real positional signal Q' (i.e. phase Q') is outputted.

S14. Detect the motor's current and generate a current signal, which corresponds to the current signal in the motor running database (four vectors' matrix). When detecting the motor's current, it also detects the DC bus current, U phase current, V phase current and W phase current and outputs the signal set.

S15. Generate the control signal according to the real positional signal, the current signal and the stored motor running parameters' database. In this step, the detected signals are compared with the motor running database to provide the control signal. In the motor running database, there are operating voltage U, the load P, PWM signal width W, the conduction angle A, the motor rotating speed V, the current vector I and the phase shift Q. During the procedure of generating the control signal, operating voltage U and PWM signal width W will be set as the predetermined starting stage. The conduction angle A is a constant (usually 60 degree). The current vector has been detected in previous step. The phase shift Q can be calculated by the next step:

According to the real position Q' detected in the previous step and the theoretical phase Q'' (theoretical phase initial value can be artificially set), the difference between them can be calculated which is phase shift Q. Then 5 data in one record are obtained, by this one set or more sets data record can be picked up. At the moment the toad P stored in the data set record is taken as the load value of the motor temporarily. The motor rotating speed V is taken as the part of the control signal to control the motor running. If there are more than one data sets record, the maximum rotating speed V can be chosen.

It is necessary to understand that the procedure discussed is only for the data processing in a specific state. For a motor running procedure, it has to be a continuous data collection, processing and adjusting procedure. This means that the procedure discussed need to carry out repeatedly and at the same time the parameters are need to adjust properly. As discussed above, the motor running includes three steps as: the rotor locating, the forced synchronous accelerating run and the synchronous (switched) run. The motor running state will switch from the forced synchronous accelerating run to the synchronous (switched) run. Then the motor is in the state of the synchronous accelerating run. From now on the running and controlling technology in this invention is the identical with the current technology. Therefore we are going to describe this invention in the stages of the rotor locating and the forced synchronous accelerating run, also describe the process during the switching:

When the system is powered on, set any initial state with a small PWM signal width W initially and keep the value for some time; during the time, detect the current value I; if the current value I exceeds three times the rated current value (the rated current value is a predetermined value), alter the value of PWM signal width W to reduce the current I. During this process, PWM signal width W is generally from 2% to 5%. This process becomes rotor locating, i.e. positioning the rotor in an initial position.

After that, it steps into the stage of the forced synchronous accelerating run. During the process, the system starts collecting the data as discussed above and generates the control signal to control the motor. What is needed is to offer the motor rotating speed V as fast as possible. Because the motor rotating speed V is in direct ratio to the PWM pulse width W, it needs to increase the value of W. Referring to the analysis above, the load P is an inferred data, so there will be the error for the control signal based on the inferred load value P. For this reason, this invention adds an adaptive adjusting system here. First of all maintain the motor working properly in a value of W, then increase the value of W. For a specific value of W, the load P can be increased with a fixed step length. The same time the system detects the motor running state and compares the detected parameters with the recorded parameters in the database. When the detected parameters (seven data) are matched with one set of data recorded in the database, it is considered that the motor is working properly with the PWM pulse width. Then the PWM pulse width W can be increased.

When the motor rotating speed V reaches to some speed, it is allowed to switch from the forced synchronous accelerating run to the synchronous run. During the period of the motor speeding up, the detection of the position is not accurate. Thus the switching step will cause the asynchronous operation. To solve the problem, the first step is to raise the motor rotating speed through the period of the forced synchronous accelerating run. Then when the motor's real positional signal is in the condition as: the three-phase position detecting signals (i.e. U phase, V phase and W phase voltage signals) is distributed evenly for increasing and decreasing, and the frequencies of three-phase position detecting signals are corresponding to the motor rotating speed. In this state, the real positional signals are considered reliable, and the switching can start. After the switching, the motor steps into the state of the synchronous run. The controlling principle technology afterwards is identical with the current technology. And we are not going to address this part.

To sum up, the three steps below can be induced to produce the control signals:

S151. Calculate the phase shift by comparing the positional signal and the theoretical positional signal;

S152. Switch the motor running state according to the motor's current running parameters;

S153. With the motor's current running state, generate the control signal by means of the received signals and the motor running parameters' database.

After the switching, the motor starts the decoupling operation in the state of the synchronous run. From now on, all the operating parameters are collected by the position detection unit and the current detection unit, not dependent on the predetermined parameter and the parameters collected from the database. When the detected signals without hops, if the stop signal is detected, the PWM pulse width W is altered to stop the motor running; if the accelerating signal is detected, the PWM pulse width W is increased to accelerate the motor; similarly if the decelerating signal is detected, W is decreased to decelerate the motor.

When the detected signals appear hops, the system will firstly decide if they are the false detection signals. If they are, the error flag indicates 1. When the total error flags roll over some amount (for instance 10), the protection program will start. If the system determines that the hops on the signals are not because of the false detection, the positional signals can be corrected by means of the motor parameters in the database.

S16. Generate the high voltage signal according to the control signal.

S17. Control the motor running by using the high voltage signal. The motor driving device is used to control the motor running by using the high voltage signal. Each circuit in U phase, V phase and W phase should use at least one separate motor driving device. In this operation procedure six control signals are generated, and with six control signals six high voltage signals are generated as well. Accordingly there will be six motor driving devices. Each high voltage signal controls one motor driving device.

The previous procedure will be repeated during the motor running to control the motor.

Figure 9:
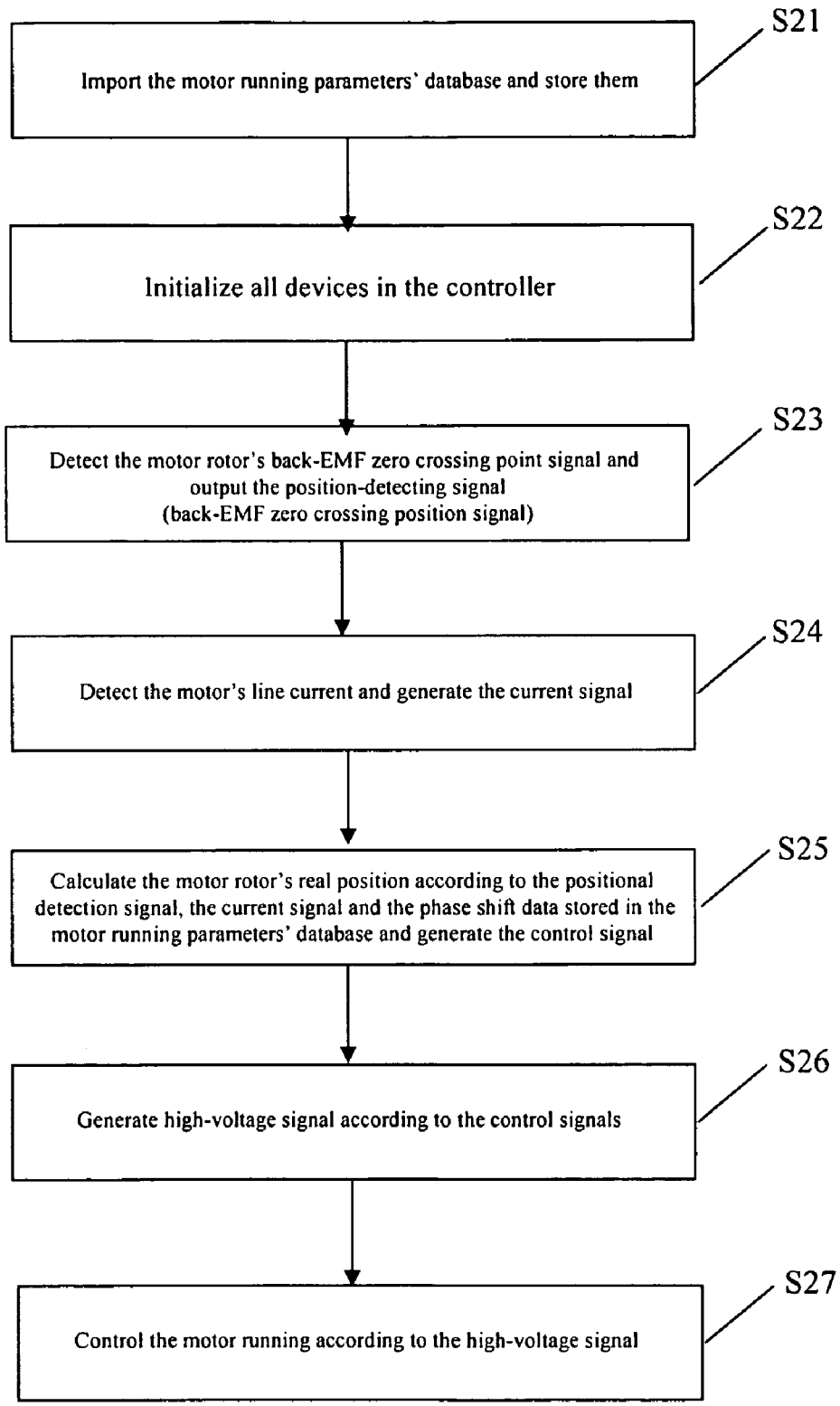
FIG. 9 shows another flow chart of the control method in the invention.

By the method shown in FIG. 8, at the first it is needed to build a motor running parameters' database. According another operation in this invention, it can be done by importing an existing motor running parameters' database. FIG. 9 shows the flow chart of the running operation in this case. It includes:

S21. Import a motor running parameters' database and store it;

S22. Initialize the devices in the controller;

S23. Detect the zero crossing point of the electrode by means of the motor's back Electromotive Force (EMF) and calculate the authentic positional signals;

S24. Detect the motor's current and generate the current signal;

S25. Generate the controlling signals by means of the positional signal, the current signal and the stored motor running parameters' database;

S26. Generate the high voltage signal according to the control signal;

S27. Control the motor running according to the high voltage signal.

In this implementation, we don't address the other operations as they are identical with those in FIG. 8.

Here we are going to address the explicit implementation of the invented brushless DC motor controller as the reference FIG. 1. FIG. 1 is the functional diagram of the controller 100. It contains:

The position-detecting unit 104, connecting to the motor 102, detects the zero crossing point of the electrode by means of the motor's 102 voltage signal and calculates the authentic positional signal. As the method discussed above, the position detection unit 104 calculates the rotor's current position by means of the 4-way voltage signals, U phase, V phase, W phase and DC bus voltage. For the four voltage signals, U phase voltage is filtered through the U phase filter circuit, and divided by U phase voltage divider circuit, then amplified by the U phase operational amplifier; V phase voltage is filtered through the V phase filter circuit, and divided by V phase voltage divider circuit, then amplified by the V phase operational amplifier; W phase voltage is filtered through the W phase filter circuit, and divided by W phase voltage divider circuit, then amplified by the W phase operational amplifier; the positive terminals of U phase, V phase and W phase operational amplifiers connect to each phase voltages, and the negative terminals connect to another voltage signal, i.e. DC bus voltage signal. Eventually in this step a rotor's real positional signal Q' (i.e. the detected phase Q') is outputted. The embodiment of the circuits will be illustrated with FIG. 7.

The current-detecting unit 106, connecting to the motor 102, detect the current and generate the current signal. The unit 106 detects the DC bus current, U phase current, V phase current and W phase current, and outputs one current signal set.

The power supply detecting unit 108, connecting to the operating power source 122, detect the operating voltage and conduct the voltage transform. Operating power source's voltage output is 300V. After the voltage transform by the power supply detecting unit 108, the transformed voltage output to the central control unit 110 is from 0V to 3V.

Figure 3:
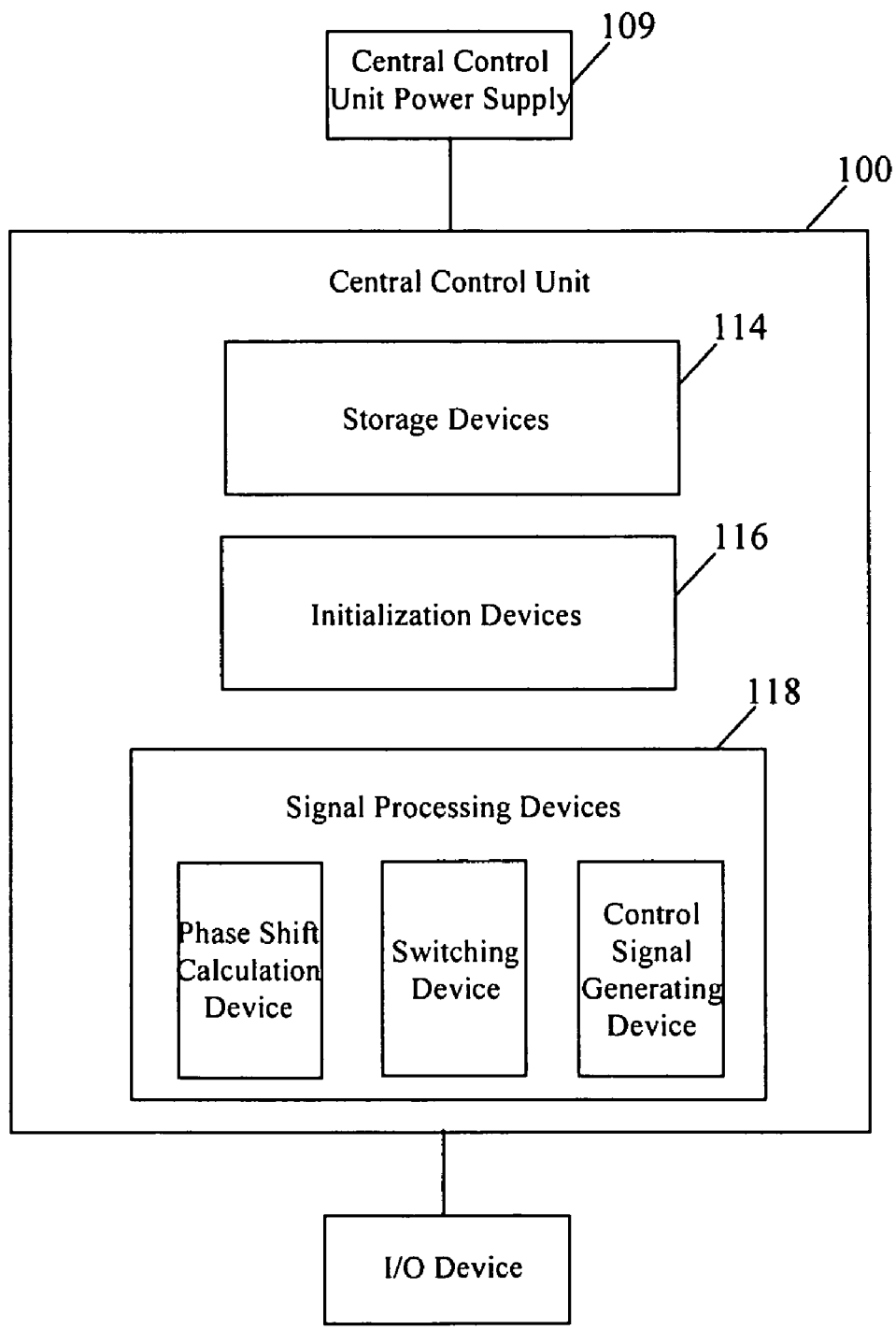
FIG. 3 shows the detail diagram of the central control unit shown in FIG. 1.

The central control unit 110, connecting to the position-detecting unit 104, current-detecting unit 106, and power supply detecting unit 108, generate the controlling signals by means of the positional signal, the current signal and the transformed voltage received. See FIG. 3:

The storage device 114, store the database of the motor running parameters. The stored motor running parameters' database contains the parameters as: the motor operating voltage U, the load P, PWM signal width W, the conduction angle A, the motor rotating speed V, the current vector I and the phase shift Q. The database is built by the steps as: set the motor operating voltage U, PWM signal width W and the conduction angle A, and gradually adjust the load P, with each P measure the speed V, the current I and the real Hall position Q', and compare Q' and the theoretical Hall position Q" to get the phase shift Q. Then the database can be built as the step S11.

The initialization device 116, initializes all devices in the controller;

The signal processing device 118, generates the central control output signal by means of the received signals from the central control unit and the database of the motor running parameters. The signal processing device 118 contains three devices: the device to calculate the phase shift given by the positional signal and the theoretical positional signal; the switching device to switch the motor running state; and the controlling signal generator to receive the motor running state signals and output the central controlling signal.

The central control unit 110 mainly conducts the functions as:

The first is to control the motor's rotor positioning. When the system is powered on, set any initial state with a small PWM signal width W initially and keep the value for some time; during the time, detect the current value I; if the current value I exceeds three times the rated current value (the rated current value is a predetermined value), alter the value of PWM signal width W to reduce the current I. Keep this state for some time to make the rotor's position correspond to the value at the initial state. During this process, PWM signal width W is generally from 2% to 5%. This process becomes rotor locating, i.e. positioning the rotor in an initial position.

After that, it steps into the stage of the forced synchronous accelerating run. During the process, the system starts collecting the data as discussed above and generates the control signal to control the motor. What is needed is to offer the motor rotating speed V as fast as possible. Because the motor rotating speed V is in direct ratio to the PWM pulse width W, it needs to increase the value of W. Referring to the analysis above, the load P is an inferred data, so there will be the error for the control signal based on the inferred load value P. For this reason, this invention adds an adaptive adjusting system here. First of all maintain the motor working properly in a value of W, then increase the value of W. For a specific value of W, the load P can be increased with a fixed step length. The same time the system detects the motor running state and compares the detected parameters with the recorded parameters in the database. When the detected parameters (seven data) are matched with one set of data recorded in the database, it is considered that the motor is working properly with the PWM pulse width. Then the PWM pulse width W can be increased.

To collect the information every time and generate the control signal, it includes the steps as: the detected signals are compared with the motor running database to provide the control signal. In the motor running database, there are operating voltage U, the load P, PWM signal width W, the conduction angle A, the motor rotating speed V, the current vector I and the phase shift Q. During the procedure of generating the control signal, operating voltage U and PWM signal width W will be set as the predetermined starting stage. The conduction angle A is a constant (usually 60 degree). The current vector has been detected in previous step. The phase shift Q can be calculated by the next step: according to the real position Q' in the previous step and the theoretical phase Q" (theoretical phase initial value can be artificially set), the difference between them can be calculated which is phase shift Q. Then 5 data in one record are obtained, by this one set or more sets data record can be picked up. At the moment the load P stored in the data set record is taken as the load value of the motor temporarily. The motor rotating speed V is taken as the part of the control signal to control the motor running. If there are more than one data sets record, the maximum rotating speed V can be chosen.

When the motor rotating speed V reaches to some speed, the central control unit 110 will switch from the forced synchronous accelerating run to the synchronous run. During the period of the motor speeding up, the detection of the position is not accurate. Thus the switching step will cause the asynchronous operation. To solve the problem, the first step is to raise the motor rotating speed through the period of the forced synchronous accelerating run. Then when the motor's real positional signal is in the condition as: the three-phase position detecting signals (i.e. U phase, V phase and W phase voltage signals) is distributed evenly for increasing and decreasing, and the frequencies of three-phase position detecting signals are corresponding to the motor rotating speed. In this state, the real positional signals are considered reliable, and the switching can start. After the switching, the motor steps into the state of the synchronous run. The controlling principle technology afterwards is identical with the current technology. And we are not going to address this part.

After the switching, the central control circuit 108 starts the motor for the decoupling operation in the state of the synchronous run. From now on, all the operating parameters are collected by the position detection unit and the current detection unit, not dependent on the predetermined parameter and the parameters collected from the database. When the detected signals without hops, if the stop signal is detected, the PWM pulse width W is altered to stop the motor running; if the accelerating signal is detected, the PWM pulse width W is increased to accelerate the motor; similarly if the decelerating signal is detected, W is decreased to decelerate the motor. When the detected signals appear hops, the system will firstly decide if they are the false detection signals. If they are, the error flag indicates 1. When the total error flags roll over some amount (for instance 10), the protection program will start. If the system determines that the hops on the signals are not because of the false detection, the positional signals can be corrected by means of the motor parameters in the database. In this implementation operation, the central control unit 110 also connects to an input/output device. This will be illustrated further with the FIG. 2. The central control unit in FIG. 3 also connects to the power 109.

Back to FIG. 1, the controller 100 contains the power drive control unit 112, which connects to the central control unit 110 to receive the control signal and generate the high voltage signal. In this operation, the power drive control unit 112 contains: the power drive device 124, connecting to the central control unit 110, receives the control signal and generate the high voltage signal output to the motor drive control circuit 112; and the power drive control power supply 126 connects to the power drive device 124.

The motor drive control unit 114, connecting to the power drive control unit 112 and the motor 102, also connecting to the power supply 122, receives the high voltage signal and control the motor 102 running according to the voltage. In this operation, the motor drive control unit 114 comprises the plural motor drive devices 128, said motor's U phase, V phase and W phase connects to at least one motor drive device respectively; each motor drive device 128 receives the high voltage signal and drives the motor; each motor drive device also connects to the operating power supply 122. Especially the motor drive control unit 114 in FIG. 2 contains six motor drive devices 128. The power drive control unit 112 outputs six-way high voltage signal. Each voltage signal controls one motor drive device 124.

Figure 2:
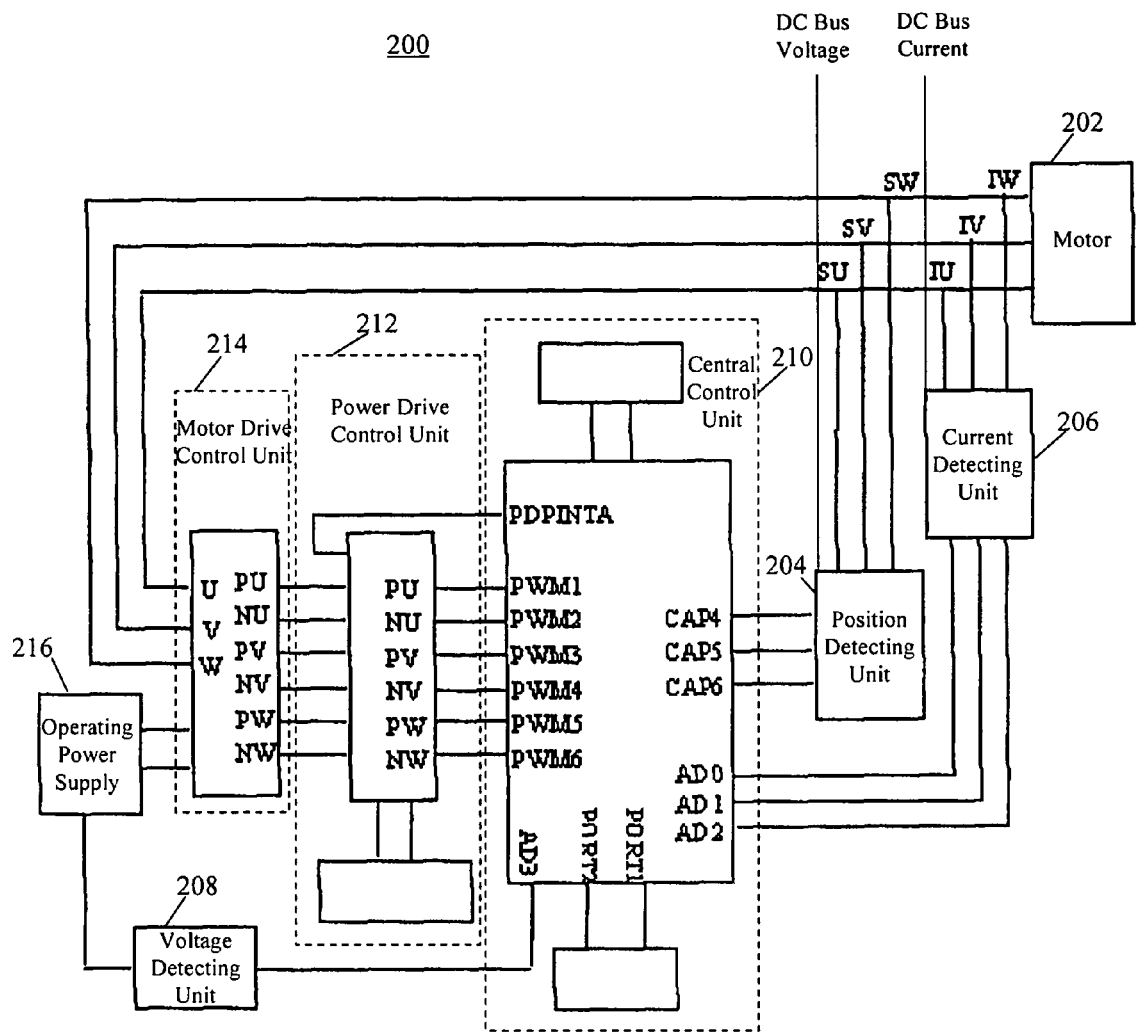
FIG. 2 shows the circuit module diagram according to FIG. 1.
Figure 7:
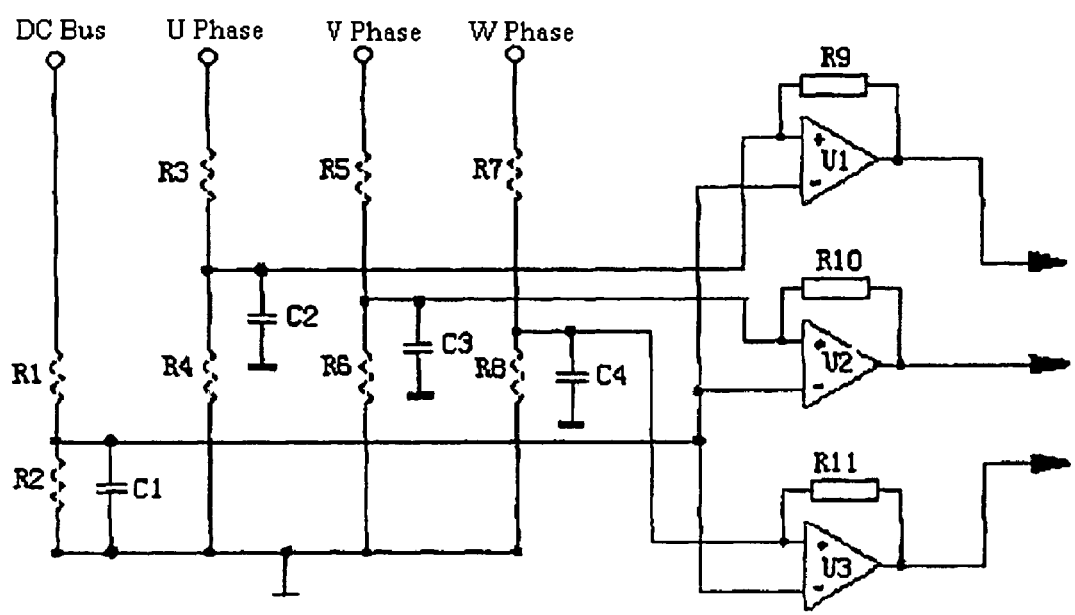
FIG. 7 shows the circuit diagram of the position-detecting circuit shown in FIG. 2.

FIG. 2 shows the circuit module diagram of the functional diagram in FIG. 1. The motor controller 200 in FIG. 2 is used for the sensorless bushless DC motor. The controller includes:

Position-detecting circuit 204, connecting to the motor 202, detects the rotor's real Hall position and outputs the measured positional signal according to the voltage signal of the motor 202. The embodiment diagram of the position-detecting circuit 204 is seen in FIG. 7, and includes:

U phase filter circuit R4 and C2, U phase voltage divider circuit R3 and R4, and U phase operational amplifier U1. U phase voltage (SU in FIG. 2) is filtered through the U phase filter circuit, and divided by U phase voltage divider circuit, then is inputted to the positive terminal of the U phase operational amplifier. The output terminal of the U phase operational amplifier is connected to the control chip 210;

V phase filter circuit R6 and C3, V phase voltage divider circuit R5 and R6, and V phase operational amplifier U2. V phase voltage (SV in FIG. 2) is filtered through the V phase filter circuit, and divided by V phase voltage divider circuit, then is inputted to the positive terminal of the V phase operational amplifier. The output terminal of the V phase operational amplifier is connected to the control chip 210;

W phase filter circuit R8 and C4, W phase voltage divider circuit R7 and R8, and W phase operational amplifier U3. W phase voltage (SW in FIG. 2) is filtered through the W phase filter circuit, and divided by W phase voltage divider circuit, then is inputted to the positive terminal of the W phase operational amplifier. The output terminal of the W phase operational amplifier is connected to the control chip 210;

The negative terminal of the U phase, V phase and W phase operational amplifier is connected to the DC voltage. The DC voltage inputs from the DC bus and is divided by R1 and R2, then outputs to the negative terminal of the operational amplifier.

Back to FIG. 2, the controller 200 includes the current-detecting circuit 206, which connects to the motor 202 and detects the current and generates the current signal. The current-detecting circuit 206 detects the DC bus current, U phase current, V phase current and W phase current and outputs the current data set.

The voltage-detecting circuit 208, connecting to the operating power supply 216, detects the operating voltage and transforms the voltage. In this operation, the operating power supply 216 is the power supply 17 with 300V. After the transform, the operating voltage becomes an analogue signal in the range of 0-3V.

The control circuit 210, connecting to the position-detecting unit 204, current-detecting unit 206, and power supply detecting unit 208, generate the controlling signals by means of the positional signal, the current signal and the transformed voltage received. The control circuit 210 can conduct: store the motor running parameters' database; initialize all devices discussed in the controller; and signal processing, generate the output control signal by means of the received signals from the control circuits and the database of the motor running parameters, wherein the signal processing further comprises the calculation of the phase shift according to the real positional signal and the theoretical positional signal; switching the motor running state; according to the motor's current running state, generate the control signal as the output of the central control unit by means of the received signals and the motor running parameters' database.

Figure 4:
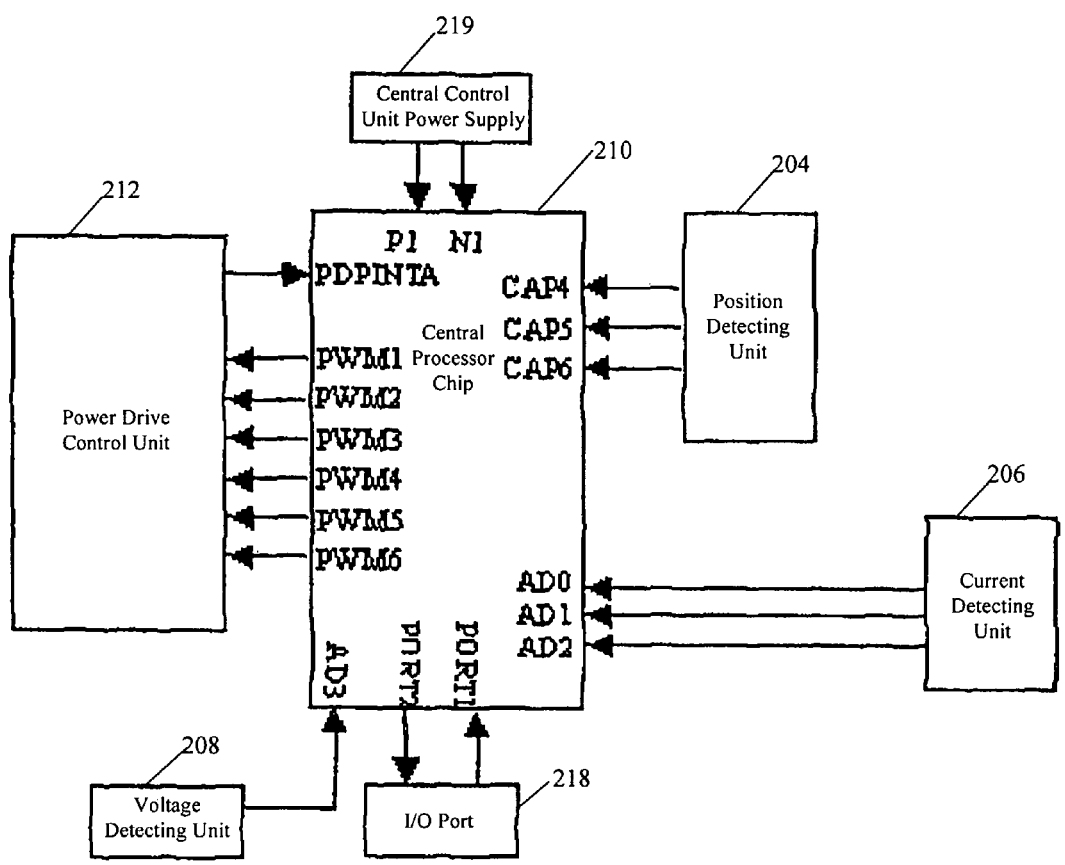
FIG. 4 shows the detail circuit diagram of the central control circuit shown in FIG. 2.

In this operation, the control circuit 210 is DSP chip shown as FIG. 4. The leads CAP4, CAP5 and CAP6 are used to receive the outputs of three operational amplifiers in the position-detecting circuit. The port AD0, AD1 and AD2 in the DSP 210 are used to receive the current-detecting signal from the current-detecting circuit. AD3 is used to receive the transformed analogue signal in the range of 0-3V. Eventually the generated control signals are 6-way paralleled output from PWM1 to PWM6 in DSP 210. In this operation, the control circuit includes the port I/O 218 to provide the I/O operation. For the circuit shown in FIG. 4, the control circuit also includes the control power supply 219.

The motor running parameters' database stored by the control circuit 210 includes: the motor operating voltage U, the load P, PWM signal width W, the conduction angle A, the motor rotating speed V, the current vector I and the phase shift Q. The database is built by the steps as: set the motor operating voltage U, PWM signal width W and the conduction angle A, and gradually adjust the load P, with each P measure the speed V, the current I and the real Hall position Q', and further compare Q' and the theoretical Hall position Q" to get the phase shift Q. The database can be also built as the step S11.

The central control unit 210 mainly conducts the functions as:

The first is to control the motor's rotor positioning. When the system is powered on, set any initial state with a small PWM signal width W initially and keep the value for some time; during the time, detect the current value I; if the current value I exceeds three times the rated current value (the rated current value is a predetermined value), alter the value of PWM signal width W to reduce the current I. Keep this state for some time to make the rotor's position correspond to the value at the initial state. During this process, PWM signal width W is generally from 2% to 5%. This process becomes rotor locating, i.e. positioning the rotor in an initial position.

After that, it steps into the stage of the forced synchronous accelerating run. During the process, the system starts collecting the data as discussed above and generates the control signal to control the motor. What is needed is to offer the motor rotating speed V as fast as possible. Because the motor rotating speed V is in direct ratio to the PWM pulse width W, it needs to increase the value of W. Referring to the analysis above, the load P is an inferred data, so there will be the error for the control signal based on the inferred load value P. For this reason, this invention adds an adaptive adjusting system here. First of all maintain the motor working properly in a value of W, then increase the value of W. For a specific value of W, the load P can be increased with a fixed step length. The same time the system detects the motor running state and compares the detected parameters with the recorded parameters in the database. When the detected parameters (seven data) are matched with one set of data recorded in the database, it is considered that the motor is working properly with the PWM pulse width. Then the PWM pulse width W can be increased.

To collect the information every time and generate the control signal, it includes the steps as: the detected signals are compared with the motor running database to provide the control signal. In the motor running database, there are operating voltage U, the load P, PWM signal width W, the conduction angle A, the motor rotating speed V, the current vector I and the phase shift Q. During the procedure of generating the control signal, operating voltage U and PWM signal width W will be set as the predetermined starting stage. The conduction angle A is a constant (usually 60 degree). The current vector has been detected in previous step. The phase shift Q can be calculated by the next step: according to the real position Q' detected in the previous step and the theoretical phase Q" (theoretical phase initial value can be artificially set), the difference between them can be calculated which is phase shift Q. Then 5 data in one record are obtained, by this one set or more sets data record can be picked up. At the moment the load P stored in the data set record is taken as the load value of the motor temporarily. The motor rotating speed V is taken as the part of the control signal to control the motor running. If there are more than one data sets record, the maximum rotating speed V can be chosen.

When the motor rotating speed V reaches to some speed, the control circuit 210 will switch from the forced synchronous accelerating run to the synchronous run. During the period of the motor speeding up, the detection of the position is not accurate. Thus the switching step will cause the asynchronous operation. To solve the problem, the first step is to raise the motor rotating speed through the period of the forced synchronous accelerating run. Then when the motor's real positional signal is in the condition as: the three-phase position detecting signals (i.e. U phase, V phase and W phase voltage signals) is distributed evenly for increasing and decreasing, and the frequencies of three-phase position detecting signals are corresponding to the motor rotating speed. In this state, the real positional signals are considered reliable, and the switching can start. After the switching, the motor steps into the state of the synchronous run. The controlling principle technology afterwards is identical with the current technology. And we are not going to address this part.

After the switching, the control circuit 210 starts the motor for the decoupling operation in the state of the synchronous run. From now on, all the operating parameters are collected by the position detection unit and the current detection unit, not dependent on the predetermined parameter and the parameters collected from the database. When the detected signals without hops, if the stop signal is detected, the PWM pulse width W is altered to stop the motor running; if the accelerating signal is detected, the PWM pulse width W is increased to accelerate the motor; similarly if the decelerating signal is detected, W is decreased to decelerate the motor. When the detected signals appear hops, the system will firstly decide if they are the false detection signals. If they are, the error flag indicates 1. When the total error flags roll over some amount (for instance 10), the protection program will start. If the system determines that the hops on the signals are not because of the false detection, the positional signals can be corrected by means of the motor parameters in the database.

Figure 5:
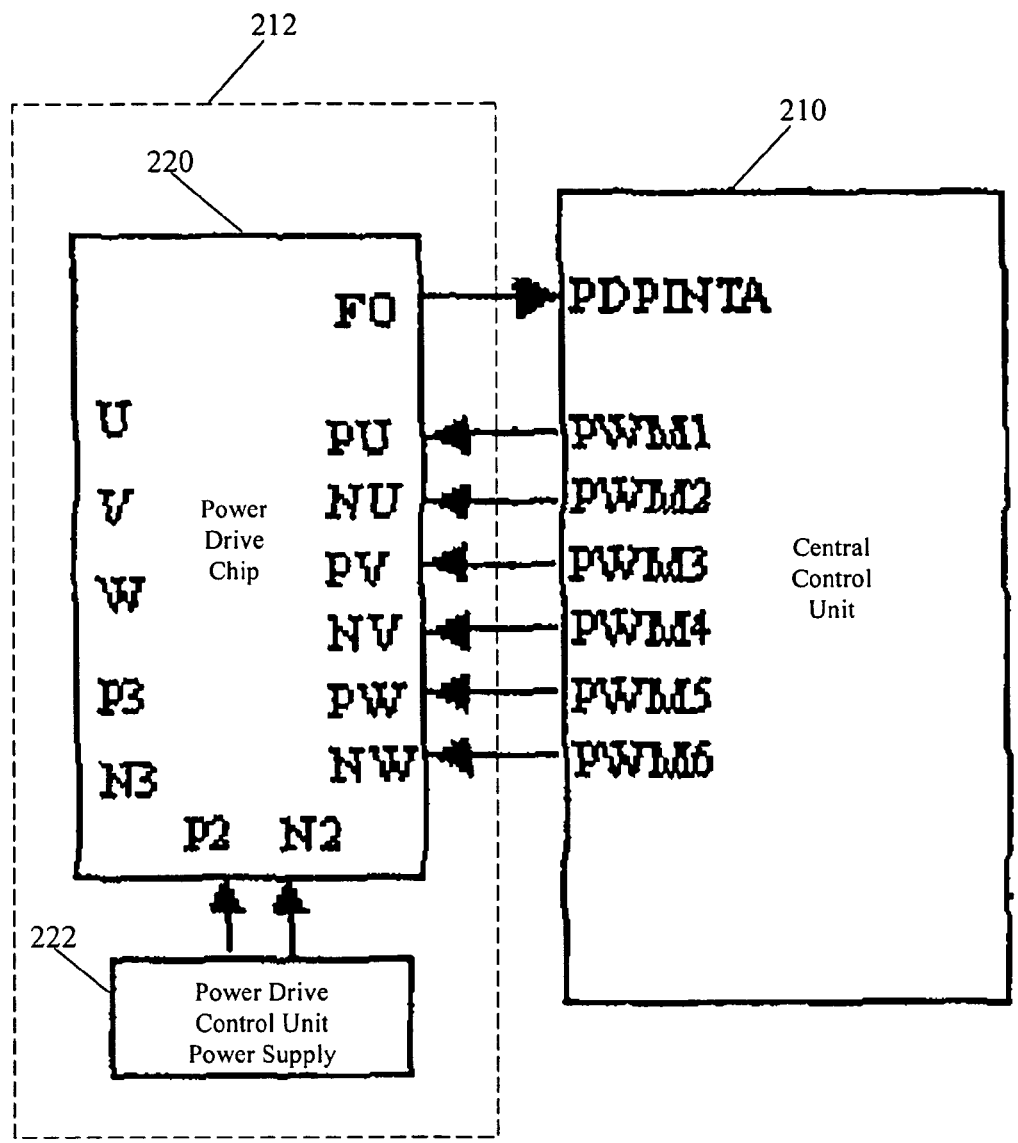
FIG. 5 shows the circuit diagram of the power drive control circuit shown in FIG. 2.

Back to FIG. 2, the controller 200 also includes the power drive control circuit 212, which connects to the control circuit 210, receives the control signal and generates high voltage signal by means of the control signal. The embodiment diagram of the power drive control circuit 212 is shown in FIG. 5, includes:

The power drive chip 220, connecting to the central processing chip 210, receives the control signal. In this operation, the control signal outputs from the leads PWM1 to PWM6 in DSP 210 are respectively received by the six leads PU, NU, PV, NV, PE, NW in the power drive chip 220. At the same time the high voltage signals according to the control signals are outputted to the motor drive control circuit; When outputting, the lead in the other side of the power drive chip 220 is used, however the name of the leads are identical with the inputs leads, they are also called PU, NU, PV, NV, PE, NW.

The power supply 222 for the power drive control circuit is connected to the power drive chip 220 and the voltage is 15V.

Figure 6:
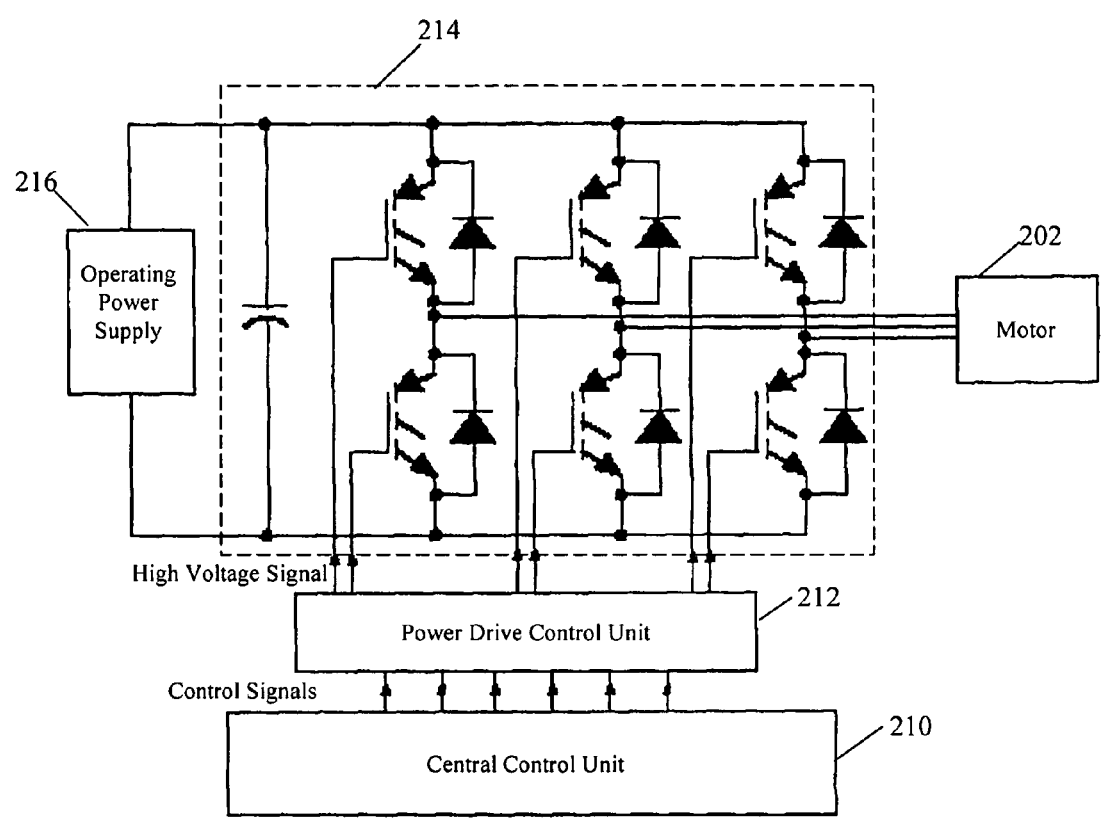
FIG. 6 shows the circuit diagram of the motor drive control circuit shown in FIG. 2.

The motor drive control unit 214, connecting to the power control circuit 212 and the motor 202, also connecting to the power supply 216, receives the high voltage signal and control the motor 202 running according to the voltage. The embodiment diagram of the motor drive control circuit 214 is shown in FIG. 6, contains a few power drive module, the motor's U phase, V phase and W phase connects to at least one power drive module respectively; the power drive modules receive the high voltage signal and drives the motor; these power drive modules also connect to the operating power supply. In this operation, the motor drive control circuit 214 contains six power drive modules. The power drive control circuit 212 outputs six-way high voltage signals, which are received by the six leads PU, NU, PV, NV, PE and NW (they are not identical with the leads in the power drive chip 210, but the same names.) in the motor drive control circuit 214. Each voltage signal controls one power drive module. The output lead U, V and W in the motor drive control circuit respectively connect to the motor's U phase, V phase and W phase.

With the technical method in this invention, the position sensor is not needed. This reduces the motor's external wiring amounts and the wiring complexity. Also the motor's seal is improved. Meanwhile, it is possible to measure the rotor's position accurately in any state according to this invention technology. Thus the motor running state can be controlled properly.

The operations discussed above are provided for the people familiar with the technical area to implement and utilize. The people familiar with the technical area can amend the operations without diverging from this invention's method. Therefore the protection of this invention is not limited by the operations above, but adapted to the range of the maximum innovation features included in the privilege claim.

What we claim is:

1. A sensorless DC motor controller for a sensorless brushless DC motor, comprising:
    a position-detecting circuit, connecting to the motor, detecting a back-EMF zero crossing point-signal of a rotor of the motor and outputting a position-detecting signal, which is a back-EMF zero crossing position signal according to three-phase voltages of the motor;
    a current-detecting circuit, connecting to the motor, detecting a line current and generating a current signal;
    a power supply detecting circuit, connecting to an operating power source, detecting an operating voltage and supplying a voltage transform;
    a central control circuit, connecting to the position-detecting circuit, current-detecting circuit, and power supply detecting circuit, generating control signals by means of the position-detecting signal, the current signal and a transformed voltage; in which the central control circuit includes:
        a storage device, storing a database of motor running parameters;
        an Initialization device, initializing all devices in the controller;
        a signal processing device, generating a central control output signal by means of received signals from the central control circuit and the database of the motor running parameters;
    a power drive control circuit, connecting to the central control circuit, receiving control signals and generating high voltage electrical signals by means of the control signals;
    a motor drive control circuit, connecting to the power drive control circuit and the motor, also connecting to an operating power supply, receiving the high voltage electrical signals and controlling motor running by means of these signals.

2. The controller of claim 1, wherein said database comprises a motor operating voltage, a load, a PWM signal width, a conduction angle, a motor rotating speed, a current vector and a phase shift.

3. The controller of claim 2, wherein said database is built by following steps: set the motor operating voltage, PWM signal width and conduction angle; gradually adjust the load, at each load detect the motor rotating speed, current and a detected back-EMF zero crossing position; further compare the detected back-EMF zero crossing position and a Hall position of controlling commutation of the motor, which is a theoretical position to calculate the phase shift.

4. The controller of claim 3, wherein said signal processing device further comprises:
    a phase shift calculating device for calculating the phase shift given by the detected back-EMF zero crossing position signal and a Hall position signal of controlling the commutation of the motor, which is a theoretical position;
    a switching device for switching a motor running state; and
    a control signal generator for receiving motor running state signals and outputting a central control signal.

5. The controller of claim 4, wherein said position-detecting circuit comprises:

a U phase filter circuit, a U phase voltage divider circuit and a U phase operational amplifier; a U phase voltage of the motor is filtered through the U phase filter circuit, and divided by the U phase voltage divider circuit, then outputted to a positive input terminal of the U phase operational amplifier; an output terminal of the U phase operational amplifier is connected to the central control circuit;

a V phase filter circuit, a V phase voltage divider circuit and a V phase operational amplifier; a V phase voltage of the motor is filtered through the V phase filter circuit, and divided by the V phase voltage divider circuit, then outputted to a positive input terminal of the V phase operational amplifier; an output terminal of the V phase operational amplifier is connected to the central control circuit;

a W phase filter circuit, a W phase voltage divider circuit and a W phase operational amplifier, a W phase voltage of the motor is filtered through the W phase filter circuit, and divided by the W phase voltage divider circuit, then outputted to a positive input terminal of the W phase operational amplifier, an output terminal of the W phase operational amplifier is connected to the central control circuit;

a negative input terminal of each of the U phase, V phase and W phase operational amplifiers is connected to a DC voltage.

6. The controller of claim 4, wherein said current-detecting circuit detects a DC bus current, a U phase current, a V phase current and a W phase current, these current signals become a set of current signal output.

7. The controller of claim 1, wherein said central control circuit also includes an I/O device.

8. The controller of claim 1, wherein said power drive control circuit comprises:
a power drive device, connecting to the central control circuit, receiving the control signals and generating a high voltage signal output to the motor drive control circuit;
a power drive controlling power-supply connecting to the power drive device.

9. The controller of claim 1, wherein said motor drive control circuit comprises a plurality of motor drive devices, a U phase, a V phase and a W phase of the motor connect to at least one motor drive device respectively; each motor drive device receives a high voltage signal and drives the motor; each motor drive device also connects to the operating power supply.

10. The controller of claim 9, wherein said motor drive control circuit comprises six motor drive devices; the power drive control circuit outputs six-way high voltage signals; each high voltage signal controls one motor drive device.

11. A sensorless DC motor controller for a sensorless brushless DC motor, comprising:
a position-detecting circuit, connecting to the motor, detecting a back-EMF zero crossing point signal of a rotor of the motor and outputting a position-detecting signal which is a back-EMF zero crossing position signal according to three-phase voltages;
a current-detecting circuit, connecting to the motor, detecting a line current and generating a current signal;
a voltage-detecting circuit, connecting to an operating power source, detecting an operating voltage and supplying a voltage transform;
a central control circuit, connecting to the position-detecting circuit, current-detecting circuit, and power supply detecting circuit, generating control signals by means of the position-detecting signal, the current signal and a transformed voltage; in which the central control circuit is configured to,
store a database of motor running parameters;
initialize all devices in the controller;
generate a control circuit output signal by means of received signals from the central control circuit and the database of the motor running parameters;
a power drive control circuit, connecting to the central control circuit, receiving control signals and generating high voltage signals by means of the control signals;
a motor drive control circuit, connecting to the power drive control circuit and the motor, also connecting to an operating power supply, receiving the high voltage signals and controlling motor running by means of these signals.

12. The controller of claim 11, wherein said database comprises the motor running parameters as a motor operating voltage, a load,
a PWM signal width, a conduction angle, a motor rotating speed, a current vector and a phase shift.

13. The controller of claim 12, wherein said database is built by following steps: set the motor operating voltage, PWM signal width and conduction angle; gradually adjust the load by detecting the motor rotating speed at each load, current and a detected back-EMF zero crossing position; further compare the detected back-EMF zero crossing position and a detected Hall position of controlling commutation of the motor, which is a theoretical position to calculate the phase shift.

14. The controller of claim 13, wherein said control circuit is further configures to:
calculate the phase shift given by the detected back-EMF zero crossing position signal and a Hall position signal of controlling the commutation of the motor, which is a theoretical position;
switch a motor running state;
receive motor running state signals and output a central control signal.

15. The controller of claim 14, wherein said position-detecting circuit comprises:
a U phase filter circuit, a U phase voltage divider circuit and a U phase operational amplifier; a U phase voltage of the motor is filtered through the U phase filter circuit, and divided by the U phase voltage divider circuit, then outputted to a positive input terminal of the U phase operational amplifier, an output terminal of the U phase operational amplifier is connected to the central control circuit;
a V phase filter circuit, a V phase voltage divider circuit and a V phase operational amplifier, a V phase voltage of the motor is filtered through the V phase filter circuit, and divided by the V phase voltage divider circuit, then outputted to a positive input terminal of the V phase operational amplifier, an output terminal of the V phase operational amplifier is connected to the central control circuit;
a W phase filter circuit, a W phase voltage divider circuit and a W phase operational amplifier, a W phase voltage of the motor is filtered through the W phase filter circuit, and divided by the W phase voltage divider circuit, then outputted to a positive input terminal of the W phase operational amplifier, an output terminal of the W phase operational amplifier is connected to the central control circuit;
a negative input terminal of each of the U phase, V phase and W phase operational amplifiers is connected to a DC voltage.

16. The controller of claim 14, wherein said current-detecting circuit detects a DC bus current, a U phase current, a V phase current and a W phase current, these current signals become a set of current signal output.

17. The controller of claim 11, wherein said central control circuit also includes an I/O port.

18. The controller of claim 11, wherein said power drive control circuit comprises:
 a power drive device, connecting to the central control circuit, receiving the control signals and generating a high voltage signal output to the motor drive control circuit;
 a power drive controlling power-supply, connecting to the power drive device.

19. The controller of claim 11, wherein said motor drive control circuit comprises a plurality of motor drive devices, a U phase, a V phase and a W phase of the motor connect to at least one motor drive device respectively; each motor drive device receives a high voltage signal and drives the motor; each motor drive device also connects to the operating power supply.

20. The controller of claim 19, wherein said motor drive control circuit comprises six motor drive devices, the power drive control circuit outputs six-way high voltage signals, each high voltage signal controls one motor drive device.

21. A method of controlling a sensorless DC motor by a sensorless DC controller, comprising:
 building a database for motor running parameters and storing the database;
 initializing all devices in the controller;
 detecting a back-EMF zero crossing point signal of a rotor of the motor according to three-phase voltages and outputting a position-detecting signal, which is back-EMF zero crossing position signal to calculate a real rotor position of the motor;
 detecting a current and generating a current signal;
 generating control signals by means of the position signal, the current signal and a transformed voltage;
 generating high voltage signals by means of the control signals;
 controlling motor running by means of the high voltage signals.

22. The method of claim 21, wherein said database comprises a motor operating voltage, a load, a PWM signal width, a conduction angle, a motor rotating speed, a current vector and a phase shift.

23. The method of claim 22, wherein said database is built by following steps: set the motor operating voltage, PWM signal width and conduction angle; gradually adjust the load by detecting the motor rotating speed at each load, current and a detected back-EMF zero crossing position; further compare the detected back-EMF zero crossing position and a detected Hall position of controlling commutation of the motor, which is a theoretical position to calculate the phase shift.

24. The method of claim 23, wherein said control signals are generated by following steps:
 calculating the phase shift given by the detected back-EMF zero crossing position signal and a Hall position signal of controlling the commutation of the motor, which is a theoretical position;
 switching a motor running state according to current motor running parameters;
 generating the control signals by means of received signals and the database together with a current running state.

25. The method of claim 24, wherein said detecting the back-EMF zero crossing point signal of the rotor of the motor to output the position signal follows steps as:
 a U phase voltage is filtered through a U phase filter circuit, and divided by a U phase voltage divider circuit, then amplified by a U phase operational amplifier;
 a V phase voltage is filtered through a V phase filter circuit, and divided by a V phase voltage divider circuit, then amplified by a V phase operational amplifier;
 a W phase voltage is filtered through a W phase filter circuit, and divided by a W phase voltage divider circuit, then amplified by a W phase operational amplifier;
 positive terminals of the U phase, V phase and W phase operational amplifiers connect to corresponding phase voltages, respectively, and negative terminals connect to a DC voltage;
 a negative input terminal of each of the U phase, V phase and W phase operational amplifiers is connected to the DC voltage.

26. The method of claim 24, wherein the process of detecting the current of the motor and generating the current signal, a current-detecting circuit detects a DC bus current, a U phase current, a V phase current and a W phase current, these current signals become a set of current signal output.

27. The method of claim 21, wherein said process to control the motor running given by the high voltage signals further comprises:
 receiving the high voltage signals and driving the motor by motor drive devices, at least one motor drive device is connected to and used for a U phase, a V phase and a W phase of the motor respectively.

28. The method of claim 27, wherein six control signals are generated in the process of generating the control signals, and wherein six-way high voltage signals are generated in the process of generating the high voltage signals by means of the control signals, and wherein six motor drive devices are used in the process of controlling the motor running according to the high voltage signals, and each voltage signal controls one motor drive device.

29. A method of controlling a sensorless DC motor controller, comprising:
 importing a database for motor running parameters and storing the database;
 initializing all devices in the controller;
 detecting a back-EMF zero crossing point signal of a rotor of a motor according to three-phase voltages and outputting a position-detecting signal, which is a back-EMF zero crossing position signal to calculate a real rotor position of the motor;
 detecting a line current of the motor and generating a current signal;
 generate control signals by means of the position-detecting signal, the current signal and a transformed voltage;
 generating high voltage signals by means of the control signals;
 controlling motor running by means of the high voltage signals.

30. The method of claim 29, wherein said database comprises a motor operating voltage, a load, a PWM signal width, a conduction angle, a motor rotating speed, a current vector and a phase shift.

31. The method of claim 30, wherein said control signals are generated by following steps:
 calculating the phase shift given by a detected back-EMF zero crossing position signal and a Hall position signal of controlling commutation of the motor, which is a theoretical position;
 switching a motor running state according to current motor running parameters;

generating the control signals by means of received signals and the database together with a current running state.

32. The method of claim 31, wherein said detecting the back-EMF zero crossing point signal of the rotor of the motor and outputting the position signal comprises steps of:
- a U phase voltage is filtered through a U phase filter circuit, and divided by a U phase voltage divider circuit, then amplified by a U phase operational amplifier;
- a V phase voltage is filtered through a V phase filter circuit, and divided by a V phase voltage divider circuit, then amplified by a V phase operational amplifier;
- a W phase voltage is filtered through a W phase filter circuit, and divided by a W phase voltage divider circuit, then amplified by a W phase operational amplifier;
- positive terminals of the U phase, V phase and W phase operational amplifiers connect to corresponding phase voltages, respectively, and negative terminals connect to a DC voltage;
- a negative input terminal of each of the U phase, V phase and W phase operational amplifiers is connected to the DC voltage.

33. The method of claim 31, wherein a current-detecting circuit detects a DC bus current, a U phase current, a V phase current and a W phase current, these current signals become one set of current signal output.

34. The method of claim 31, wherein said process to control the motor running given by the high voltage signal further comprises:
- receiving the high voltage signals and driving the motor by motor drive devices, at least one motor drive device is connected to and used for a U phase, a V phase and a W phase of the motor, respectively.

35. The method of claim 34, wherein six control signals are generated in the process of generating the control signals, wherein six-way high voltage signals are generated in the process of generating the high voltage signals by means of the control signals, wherein six motor drive devices are used in the process of controlling the motor running according to the high voltage signals, and wherein each voltage signal controls one motor drive device.

* * * * *